(12) United States Patent
Masutani

(10) Patent No.: US 8,724,147 B2
(45) Date of Patent: May 13, 2014

(54) IMAGE PROCESSING PROGRAM

(75) Inventor: Eriko Masutani, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 174 days.

(21) Appl. No.: 13/075,517

(22) Filed: Mar. 30, 2011

(65) Prior Publication Data

US 2012/0062940 A1    Mar. 15, 2012

(30) Foreign Application Priority Data

Sep. 9, 2010    (JP) .................................. 2010-201512

(51) Int. Cl.
 *G06F 3/12*    (2006.01)
 *G06K 15/00*    (2006.01)
 *G06F 3/00*    (2006.01)

(52) U.S. Cl.
 USPC ....... 358/1.15; 358/1.14; 358/1.16; 358/1.17; 358/1.18; 715/723

(58) Field of Classification Search
 USPC ....................................................... 358/1.15
 See application file for complete search history.

(56) References Cited

U.S. PATENT DOCUMENTS

| | | | | |
|---|---|---|---|---|
| 6,285,461 | B1 * | 9/2001 | Fujii et al. ..................... | 358/1.18 |
| 2001/0049703 | A1 * | 12/2001 | Miyoshi et al. ............... | 707/527 |
| 2002/0135806 | A1 | 9/2002 | Yoshino | |
| 2004/0249979 | A1 | 12/2004 | Yamaguchi et al. | |
| 2006/0041589 | A1 * | 2/2006 | Helfman et al. ............ | 707/104.1 |
| 2008/0307308 | A1 * | 12/2008 | Sullivan et al. ............... | 715/723 |

FOREIGN PATENT DOCUMENTS

| | | |
|---|---|---|
| JP | 2000-353137 | 12/2000 |
| JP | 2002-351636 A | 12/2002 |
| JP | 2007-94950 A | 4/2007 |
| JP | 2010-160769 | 7/2010 |
| WO | WO 03/032144 A1 | 4/2003 |

\* cited by examiner

*Primary Examiner* — Fred Guillermety
*Assistant Examiner* — Henok A Shiferaw
(74) *Attorney, Agent, or Firm* — Scully, Scott, Murphy & Presser, P.C.

(57) ABSTRACT

A non-transitory computer-readable medium having instructions to control a computer, which is configured to display a webpage including a webpage image based on webpage data, to perform a method of image forming control, the method including: receiving an instruction to select an area on the display screen as a selection area; storing selection area webpage data; storing first image data having a first format generated based on the selection area webpage data; storing image data having the first format representing the webpage image in the selection area, as a second image data; detecting an image absence area, wherein a content of the first image data display is absent from that of the second image data; generating correspondence image data corresponding to the image absence area; compositing the correspondence image data into the image absence area to produce composite image data; and outputting the composite image data.

9 Claims, 11 Drawing Sheets

IMAGE PROCESSING PROGRAM

CROSS-REFERENCE TO RELATED APPLICATION

This application claims priority from Japanese Patent Application No. 2010-201512 filed on Sep. 9, 2010, the entire subject matter of which is incorporated herein by reference.

BACKGROUND

1. Technical Field

The present invention relates to an image forming processing program to generate image data of a selection area.

2. Background Art

A related art discloses a technology of designating (clipping) a user-intended range from a webpage displayed on a monitor of a personal computer and printing an image of the designated range.

SUMMARY

However, when the desired range of the webpage is clipped, it may not be possible to acquire a portion of the webpage data for generating an image of the webpage. For example, when an image is displayed by plug-in of the word processor software, the spreadsheet software and the like or when an image is displayed by using the script (simple program for using various functions with the browser), the data of the images may not be acquired in some cases. In this case, a clip image having a blank portion may be acquired. The technology of a related art cannot deal with the situation in which a portion of the webpage data cannot be acquired.

In addition, when a screen shot, which saves a screen image displayed on a monitor as image data, is used, the clip image having a blank portion is not acquired even when a portion of the webpage data cannot be acquired. However, according to the screen shot, the resolution of the clip image to be acquired is determined by the resolution of the monitor. Accordingly, it may be not acquired the clip image having high resolution. In the present invention, a technology to solve such inconvenience is provided.

In an exemplary aspect of the present invention, a non-transitory computer-readable medium having instructions to control a computer, which is configured to display a webpage including a webpage image based on webpage data provided from a source of the webpage data on a display screen of a display device, to perform a method of image forming control, the method including: receiving an instruction to select an area on the display screen as a selection area; storing selection area webpage data, which is the webpage data included in the selection area, in a storage unit; storing first image data having a first format generated based on the selection area webpage data, in the storage unit; storing image data having the first format representing the webpage image in the selection area on the display screen, in the storage unit, as a second image data having the first format; detecting an image absence area, wherein a content of the first image data display in the image absence area is absent from that of the second image data; generating correspondence image data corresponding to the image absence area; compositing the correspondence image data generated in the generating the correspondence image data into the image absence area of the first image data to produce composite image data; and outputting the composite image data produced during the compositing as image data of the selection area.

When the computer is configured to function as the described above by instructions to perform the image processing, it is possible to generate the correspondence image data corresponding to the image absence area by the generating even though the image data of the image absence area cannot be acquired when the user selects the selection area. In addition, the correspondence image data can be compositing into the image absence area of the first image data by the compositing. Accordingly, it is possible to prevent a portion of the image data of the selection area from being blank.

DESCRIPTION OF PREFERRED ILLUSTRATIVE ASPECTS

Figure 1:
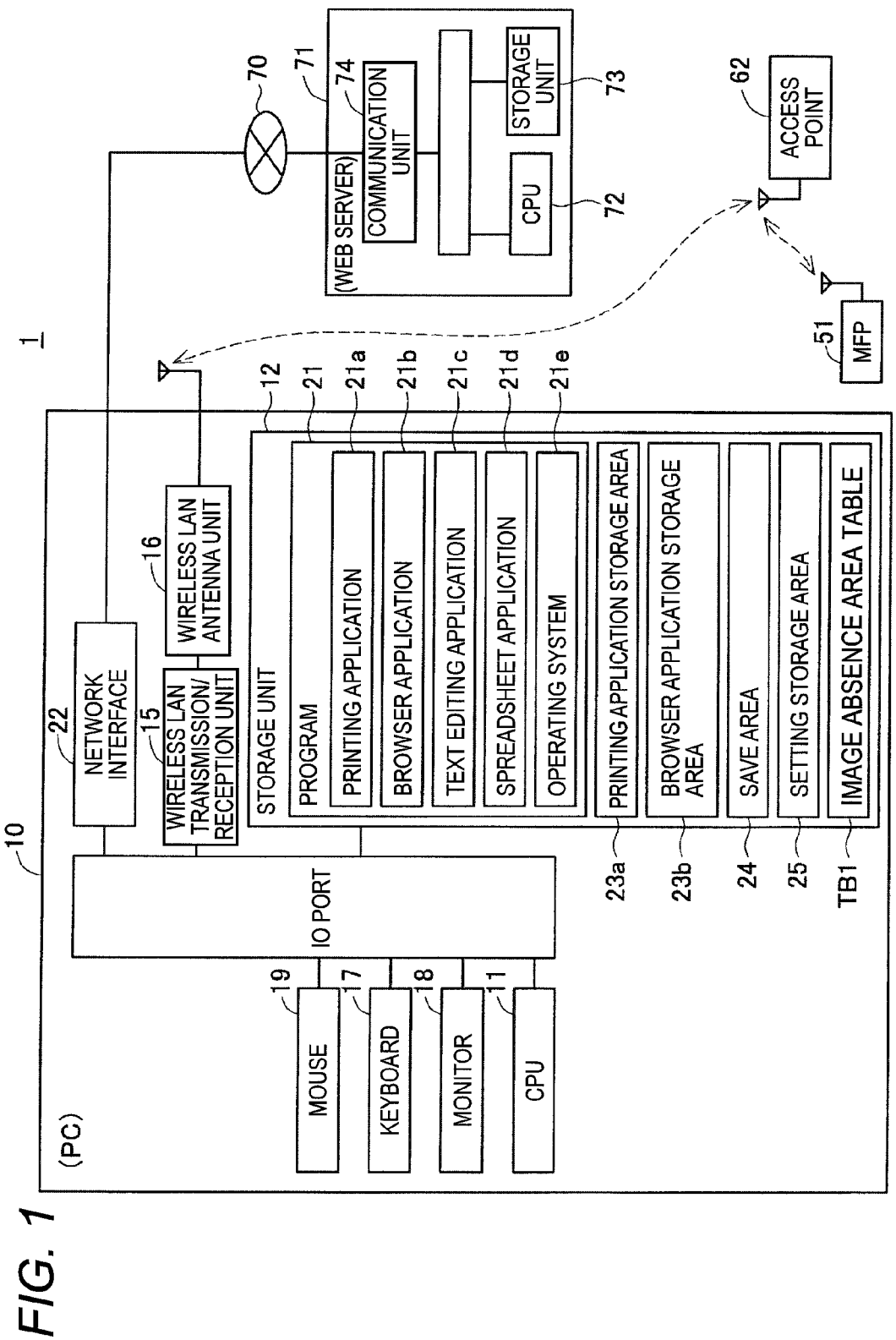
FIG. 1 is a block diagram illustrating a configuration of a communication system.

FIG. 1 shows a block diagram of a communication system 1 that is exemplified as an illustrative aspect of the present invention. The communication system 1 includes a personal computer (PC) 10, a multifunction peripheral (MFP) 51, an access point 62 and a web server 71. The MFP 51 has printer, scanner, copier and facsimile functions and the like. The access point 62 is a known relay apparatus.

The PC 10 and the access point 62 can perform wireless communication by a wireless LAN way. In addition, the MFP 51 and the access point 62 can perform wireless communication by the wireless LAN way. Additionally, the PC 10 and the web server 71 are connected to communicate with each other via an internet 70.

A configuration of the PC 10 will be described. The PC 10 mainly has a CPU 11, a storage unit 12, a wireless LAN transmission/reception unit 15, a wireless LAN antenna unit 16, a keyboard 17, a monitor 18, a mouse 19 and a network interface 22.

The CPU 11 controls the respective functions by programs stored in the storage unit 12, various signals transmitted and received via the wireless LAN transmission/reception unit 15, and the like. In the meantime, the storage unit 12 may be configured by a combination of a random access memory (RAM), a read only memory (ROM), a flash memory, a hard disk drive (HDD) and the like.

The wireless LAN transmission/reception unit 15 performs the wireless communication via the wireless LAN antenna unit 16. By the wireless LAN transmission/reception unit 15, digital signals configuring various data are transmitted and received. In addition, the network interface 22 performs a variety of communications with the web server 71 via the internet 70. The keyboard 17 is keys for executing the respective functions of the PC 10. The monitor 18 displays a variety of function information of the PC 10. The mouse 19 is a known device for inputting a user's operation.

The storage unit 12 has a printing application storage area 23*a*, a browser application storage area 23*b*, a save area 24, a setting storage area 25 and an image absence area table TB1. The printing application storage area 23*a* is an area that stores default clip image data CI1, user-setting clip image data CI2, window shot image data SI1, clip outline image data OCI1, shot outline image OSI1 and the like, which will be described below. The browser application storage area 23*b* is an area that stores internet information (temporary files) for a browser application 21*b*. Data of a webpage is stored as cache data in the browser application storage area 23*b*. Accordingly, when re-opening a webpage that has been recently visited, the cache data is displayed without re-downloading the data from the web server 71. Accordingly, it is possible to increase the display speed of the web page and to prevent congestion of the internet 70.

The save area 24 is an area that stores processing-completed image data as final data. The final data stored in the save area 214 is transmitted to the MFP 51, and a variety of processing such as printing is performed.

The setting storage area 25 is an area to store a variety of settings. The setting storage area 25 stores, for example, a clip condition, a background data acquirement invalidating setting and the like. The clip condition is a condition that is applied when acquiring image data in a designation area of a webpage image. The clip condition may include a condition of acquiring color image data or black-white image as the clip image data. In addition, the clip condition may be preset by a user. The background data acquirement invalidating setting will be described. As described below, a variety of display portions are displayed on the webpage image. In addition, for each of the display portions, it is possible to designate whether each of the display portions is a display portion to be used as a background. When enabling the background data acquirement invalidating setting, it may be set such that the display portion designated as the background is not acquired in executing the clip process.

Figure 12:
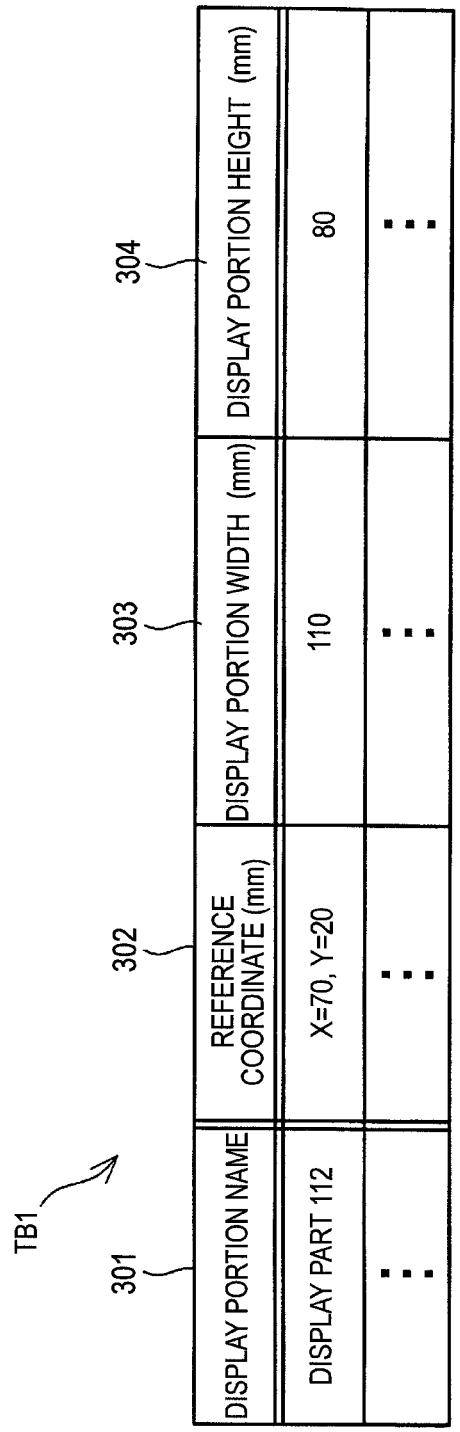
FIG. 12 is a view illustrating an example of an image absence area table.

FIG. 12 shows an example of the image absence area table TB1. The image absence area table TB1 is a table that stores information of a display portion positioned in an image absence area, which will be described below. The image absence area table TB1 stores a display portion name 301, a reference coordinate 302, a display portion width 303 and a display portion height 304. The display portion name 301 is an ID for identifying a display portion positioned in the image absence area. The reference coordinate 302 is a reference point for indicating a position on a selection area 102 of a display portion. The display portion width 303 is a width of the display portion. The display portion height 304 is a height of the display portion.

The storage unit 12 stores a program 21. The CPU 11 executes a process in response to the program 21 in the storage unit 12. The program 21 includes a printing application 21*a*, a browser application 21*b*, a text editing application 21*c*, a spreadsheet application 21*d* and an operating system 21*e*.

The printing application 21*a* is an application to cause the MFP 51 to execute a printing process and the like from the PC 10. The browser application 21*b* is an application to display a webpage image on the monitor 18. The CPU 11 executes a process in response to the browser application 21*b*. In this process, the CPU downloads the HTML (HyperText Markup Language) data from a web server (for example, web server 71) and the reference image data that is referred to by a data reference tag in the HTML data is downloaded from a reference destination. The CPU 11 stores the downloaded HTML data, the reference image data and the like in the browser application storage area 23*b*. In addition, the CPU 11 makes up webpage image data, which is full-color bitmap data, by using the HTML data, the reference image data and the like and displays the webpage image on the monitor 18 based on the made webpage image data. The text editing application 21*c* is an application to make up, edit and save data files including text data, image data and the like.

The operating system 21*e* is a program that provides basic functions, which are commonly used in the printing application 21*a*, the spreadsheet application 21*d* and the like. The CPU 11 manages to pass the image data and the like between the printing application 21*a* to the spreadsheet application 21*d* in accordance with the operating system 21*e*. Accordingly, the browser application 21*b*, the text editing application 21*c* and the spreadsheet application 21*d* are cooperated, thereby displaying a webpage image 101.

A configuration of the web server 71 will be described. The web server 71 mainly has a CPU 72, a storage unit 73 and a communication unit 74. In the network, the web server 71 is an apparatus that provides a client apparatus with the webpage data (HTML data and reference image data) kept in the web server and various functions. The CPU 72 controls the respective functions. The storage unit 73 stores therein various HTML data, reference image data and the like. The communication unit 74 communicates a variety of information with the PC 10.

Figure 8:
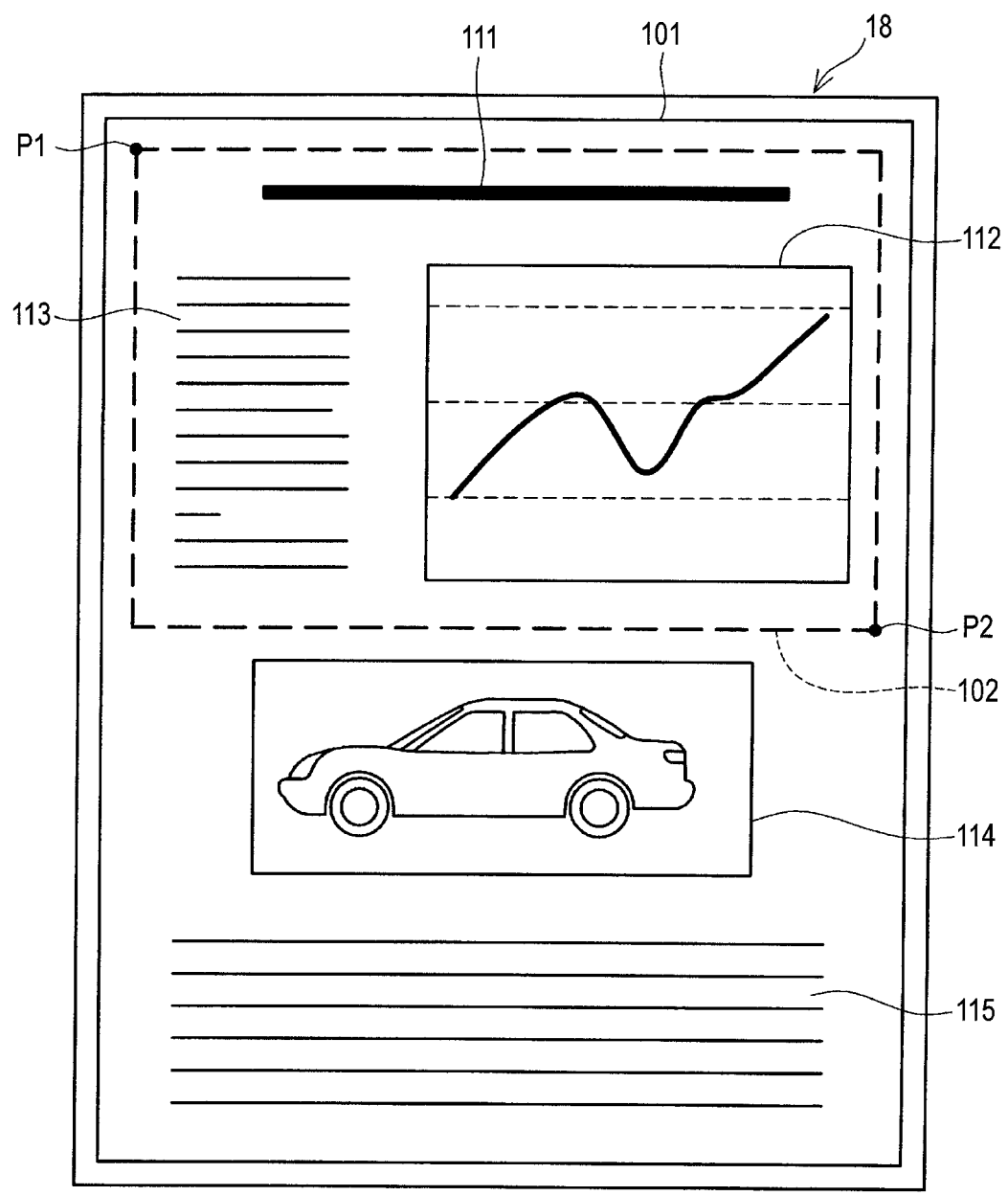
FIG. 8 is a view illustrating an example of an image generated by webpage image data.

An operation of the communication system 1 according to this illustrative aspect will be described. FIG. 8 shows an example of a webpage image 101 that is displayed on the monitor 18. In the webpage image 101 of FIG. 8, display portions 111 to 115 are included. The display portions 111, 113, 115 are display portions of texts. The display portions 112, 114 are display portions of figures. In the meantime, the webpage image 101 as shown in FIG. 8 is an image that the CPU 11 functioning in response to the browser application 21*b* makes the HTML data received from the web server 71 into image data and then displays the same on the monitor 18.

Figure 2:
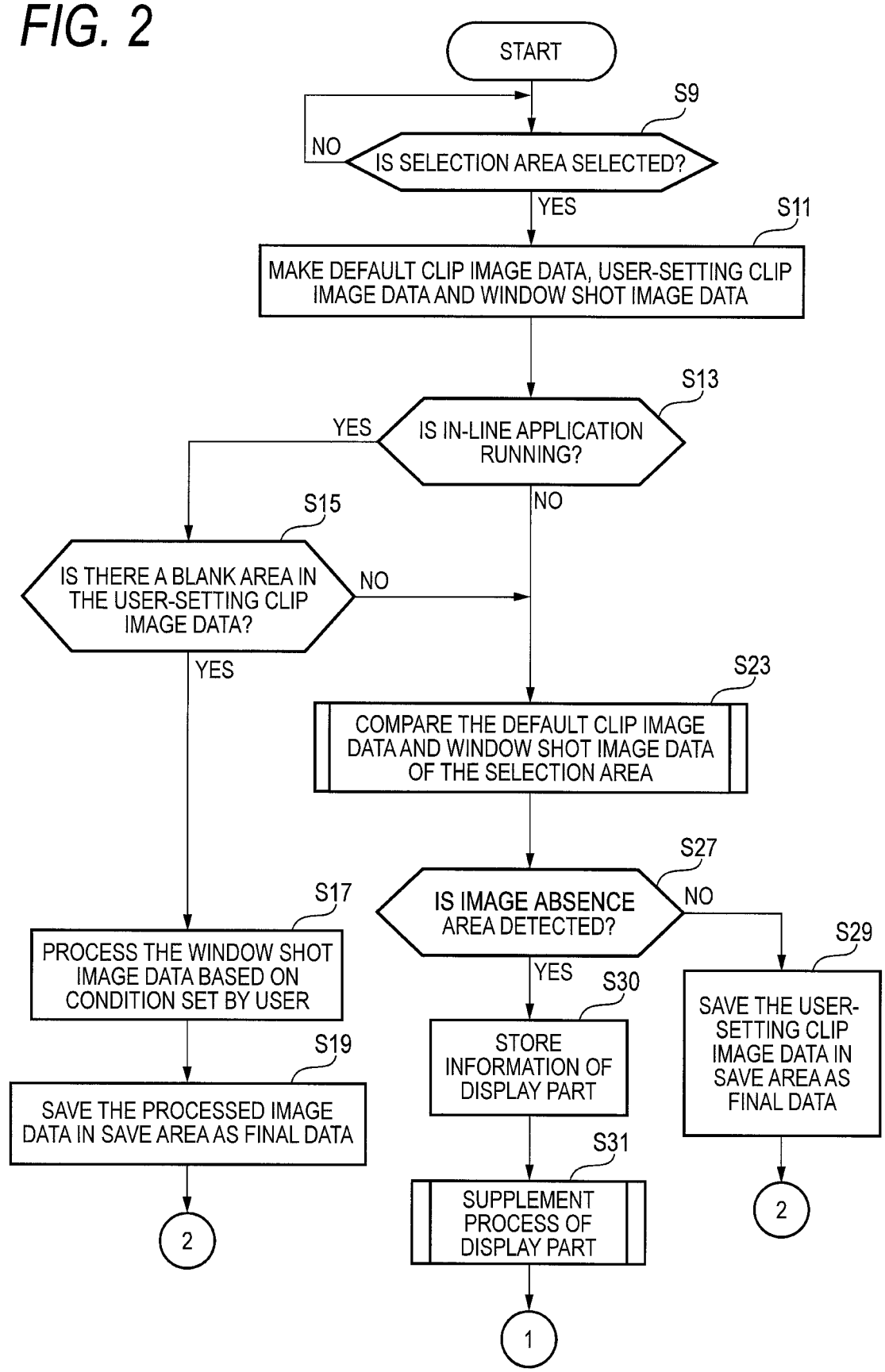
FIG. 2 illustrates a first operating flow chart of a printing application.

When the printing application 21*a* runs, a flow of FIG. 2 is started. In step S9, the CPU 11 determines whether a user selects the selection area 102 from the webpage image 101 displayed on the monitor 18. The selection area 102 is selected by an input device such as mouse 19. For example, a method of selecting the selection area 102 shown in FIG. 8 will be described. A user moves a cursor to a starting point P1 on the webpage image 101 and then moves the cursor in a right-lower direction of the monitor 18 while pushing a button of the mouse 19. Then, the user releases the pushing of the button of the mouse 18 at an end point P2, so that the selection area 102 is selected. When the selection area 102 is not selected (step S9: NO), the processing returns to step S9 and stands by. When the selection area is selected (step S9: YES), the processing proceeds to step S11.

In step S11, the CPU 11 performs a clip process and a shot process for the webpage image in the selection area 102. Here, the clip process is a method of acquiring clip image data being the full-color bitmap data by the known method. The known method includes a method of specifying HTML data, which is a base of a display portion included in the selection area, and making up clip image data based on the specified HTML data and a method of making clip image data in the selection area 102 by the processing in response to the browser application 21b by using the API (Application Program Interface) and the like and acquiring the made clip image data. In the meantime, the acquired clip image data is stored in the printing application storage area 23a. There are various methods of specifying a display portion to be clipped by using the selection area 102. For example, when a boundary of the selection area 102 is portionially overlapped with a display portion, the corresponding display portion may be specified as a clip object. On the other hands, only a display portion entirely surrounded by the selection area 102 may be specified as the clip object.

By the clip process of step S11, default clip image data CI1 and user-setting clip image data CI2 are made up. The default clip image data CI1 is image data generated by clipping the webpage image 101 displayed on the monitor 18 without changing a setting of presence or absence of the background image or a setting of color/black-white. In other words, the default clip image data is a clip image that is made under a condition equivalent to the shot process, which will be described later. In addition, the user-setting clip image data CI2 is image data generated by clipping the webpage image based on a clip condition set by a user.

In addition, window shot image data SI1 is made by the shot process. The shot process is a known process of acquiring bitmap data (for example, webpage image date) that is a base of the image (for example, webpage data 101) displayed on the monitor 18. For example, the shot process includes a process in which the CPU 11 acquires the image data that is a base of the webpage image 101 displayed on the monitor 18 by using the API of the operating system 21e (alternatively, the CPU 11 may acquire the image data that is a base of the entire image displayed on the monitor 18 and extract only the image data corresponding to the webpage image 101) or a process in which the CPU 11 accesses an image memory for displaying an image on the monitor 18 and reads out and acquires the image data that is a base of an image in an area surrounded by the selection area 102 from the image data stored in the image memory. In the meantime, the acquired window shot image data SI1 is stored in the printing application storage area 23a.

Figure 9A:
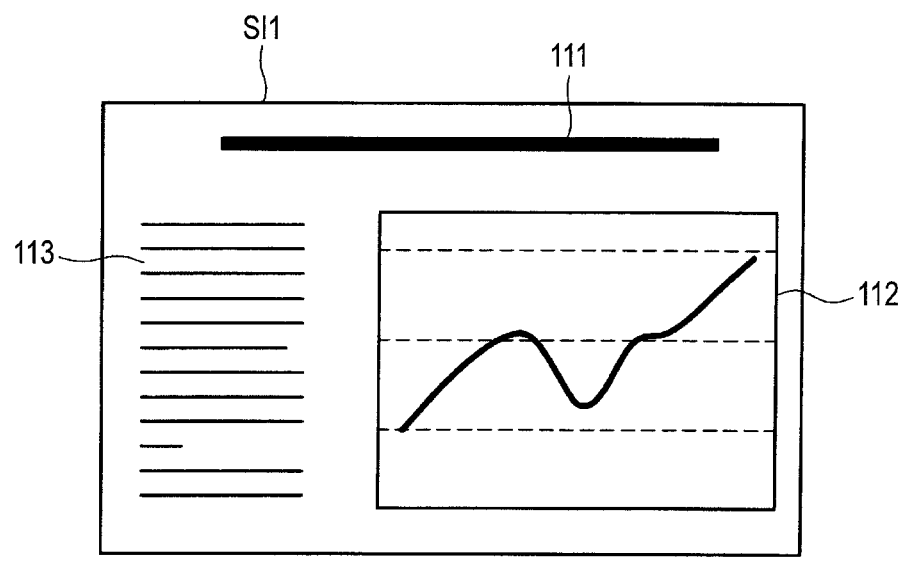
FIG. 9A and FIG. 9B are views illustrating an example of an image generated by default clip image data.
Figure 10A:
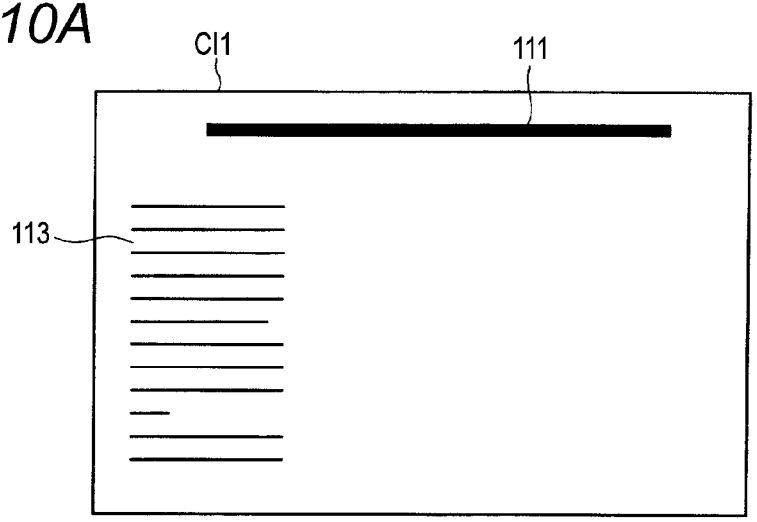
FIGS. 10A to 10C are views illustrating an example of an image generated by default clip image data.

In this illustrative aspect, when the selection area 102 shown in FIG. 8, an image generated by the window shot image data SI1 is selected is shown in FIG. 9A and an image generated by the default clip image data CI1 is shown in FIG. 10A. In the image (FIG. 9A) generated by the window shot image data SI1, the display portion 112 is displayed. In the meantime, in the image (FIG. 10A) generated by the default clip image data CI1, the display portion 112 is not displayed. Since the window shot image data SI1 is extracted the image of the webpage image 101 as image data of a bitmap format by the shot process, a situation is not caused in which the display portion displayed as the webpage image 101 is not displayed as an image generated by the window shot image data SI1. On the other hand, since the default clip image data CI1 is extracted the HTML data or reference image data of the display portion included in the selection area 102, when the reference image data and the like cannot be acquired, a clip image in which a display portion is failed may be made. Four patterns causing the fail will be described, as examples.

A first pattern is a case such that, when the CPU 11 displays an image in response to the browser application 21b, an image is generated from the image data by a process in response to the plug in of in-line applications (such as text editing application 21c and spreadsheet application 21d) and the like. Since the display is not made by the browser application 21b itself, the image data of a display portion may not be acquired even when the CPU 11 accesses a process in response to the browser application 21b from a process in response to the printing application 21a.

A second pattern is a case such that a diagram or image is provided in a script reference format such as server side script and java script. In this case, since a path name or file name of the reference image data is not described in the reference tag, the corresponding image data cannot always be acquired by accessing a reference destination (for example, server apparatus storing the reference image data) or the cache data stored in the browser application storage area 23b.

A third pattern is a case such that a path name of the reference image data is described as a relative path name in the reference tag. In this case, since it is not possible to specify an absolute path name of the reference destination, the image data of a figure or display portion cannot always be acquired.

A fourth pattern is a case such that a display portion is arranged with being designated as a background. In the background data acquirement invalidating setting during the clip process, it is possible to set such that a display portion being designated as a background image is not clipped. Accordingly, it is possible to prevent a display portion, which is displayed with being overlapped with a background image, from being hard to see or the data amount of the clip data from being enlarged too much. However, when a display portion that is to be displayed is designated as a background image, a situation is caused in which a display portion to be displayed is not clipped and displayed.

In the followings, a response to a case where a not-displayed display portion exists will be described. In step S13, the CPU 11 determines whether the in-line application is running. When the in-line application is running (step S13: YES), the CPU 11 determines that there is a possibility of a display portion being failed in the first pattern and proceeds to step S15. In step S15, the CPU 11 determines whether a blank area (blank display area) exists in the image generated by the user-setting clip image data CI2. Specifically, when it cannot acquire the image data even when accessing the process in response to the browser application 21b from the process in response to the printing application 21a, the CPU determines that a blank area is generated in the process in response to the printing application 21a. When a blank area does not exist (step S15: NO), the processing proceeds to step S23. On the other hand, when a blank area exists (step S15: YES), the CPU determines that it fails to acquire the image data and proceeds to step S17.

Figure 3:
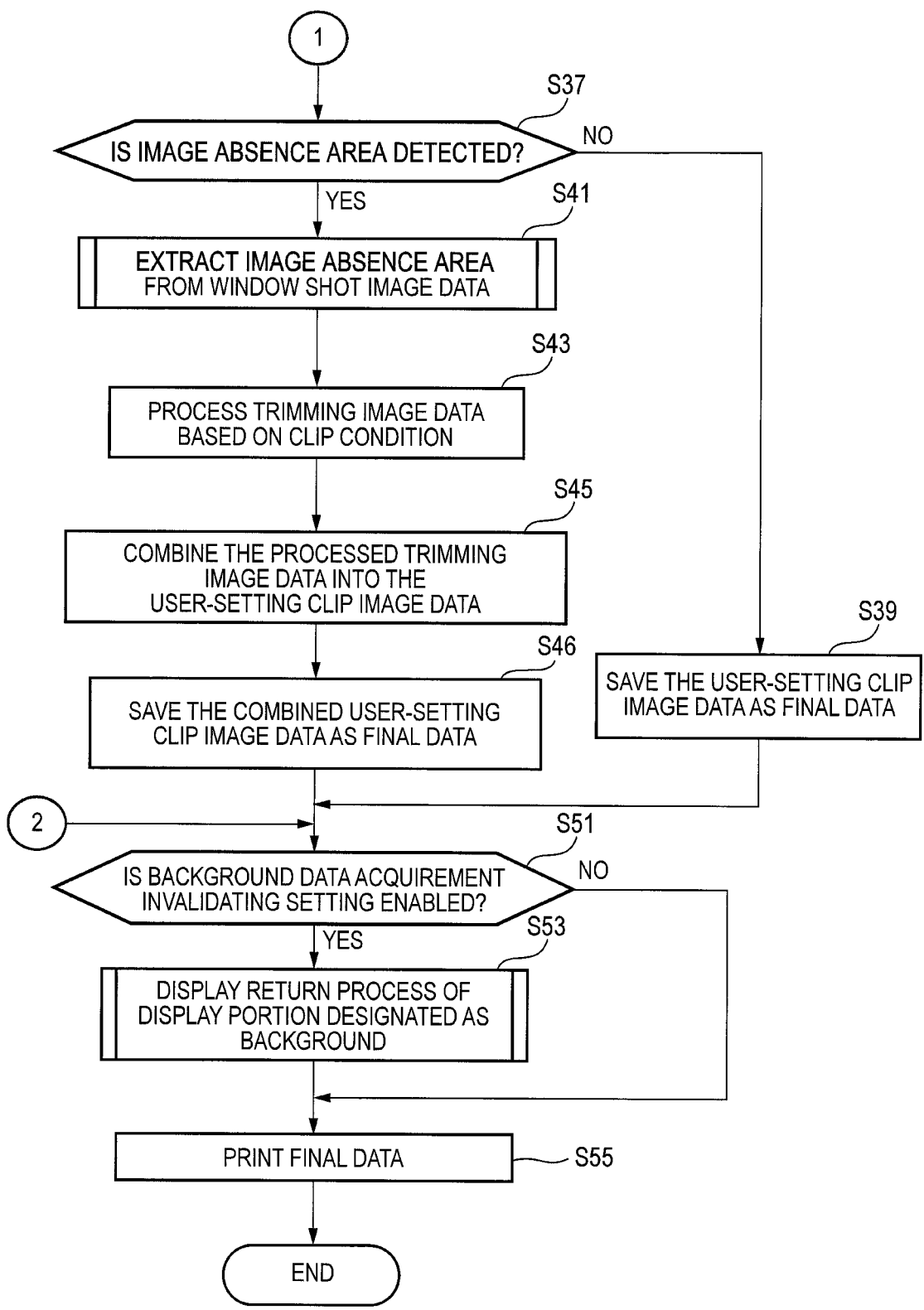
FIG. 3 illustrates a second operating flow chart of a printing application.

In step S17, the CPU 11 processes the window shot image data SI1 by the user-setting condition. In step S19, the CPU 11 saves the processed image data in the save area 24, as the final data. Then, the processing proceeds to step S51 (FIG. 3).

Figure 4:
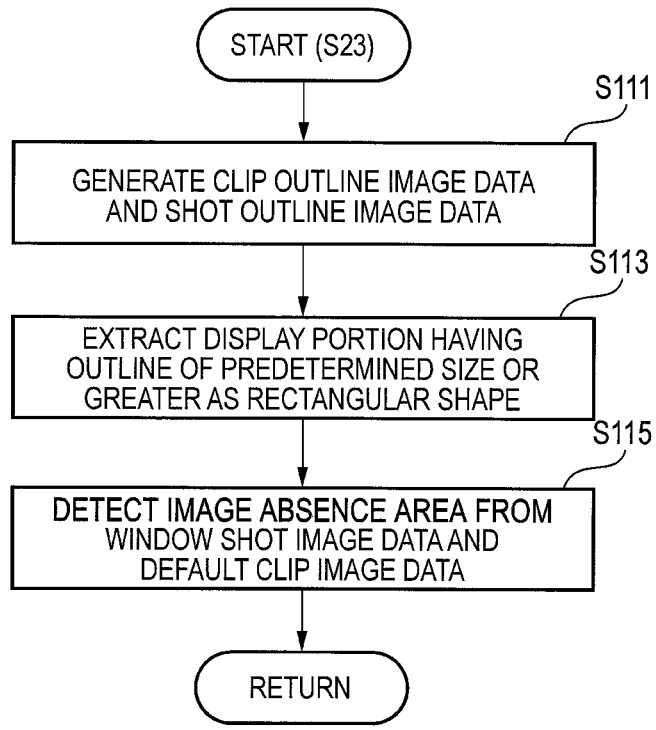
FIG. 4 illustrates a third operating flow chart of a printing application.

Additionally, in step S13, when the in-line application is not running (step S13: NO), the processing proceeds to step S23. In step S23, the CPU 11 compares the default clip image data CI1 of the selection area 102 with the window shot image data SI1. The process of step S23 will be described with reference to a flow of FIG. 4. In step S111, the CPU 11 performs outline processing for the default clip image data CI1 and the window shot image data SI1 of the selection area 102, thereby generating clip outline image data OCI1 and shot outline image data OSI1. The outline processing is a process of acquiring image data in which characteristic portions of the respective display portions displayed in the webpage image 101, such as outlines, are emphasized. In the meantime, since the outline processing is the known technology, the detailed descriptions will be omitted. Since it is possible to perform the process by using the image data having the emphasized characteristic portions and the smaller data amount by the outline processing, it is easy to detect whether images are identical.

Figure 9B:
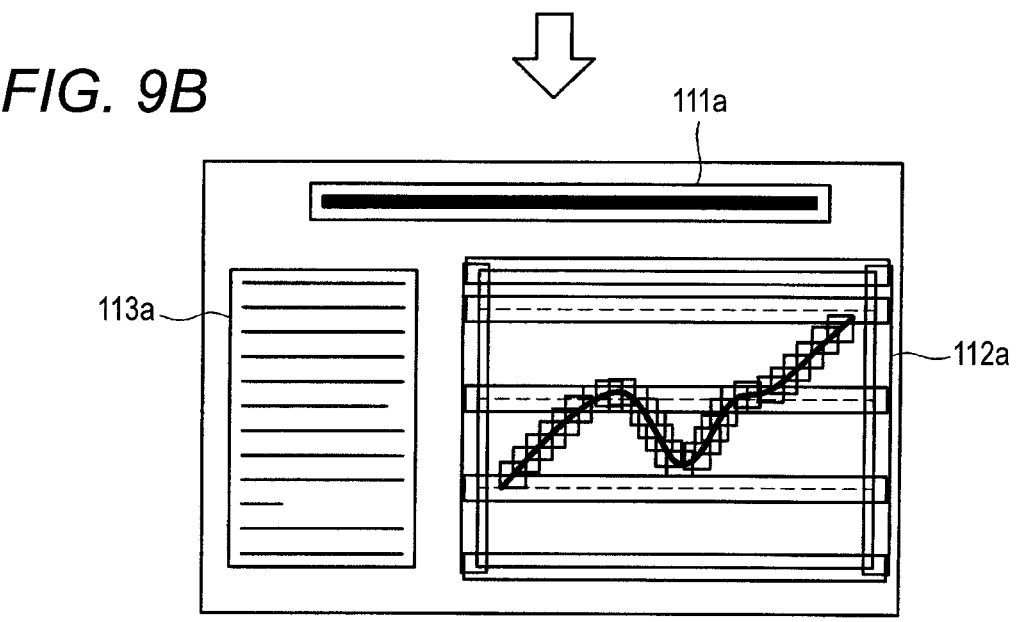
Figure 10B:
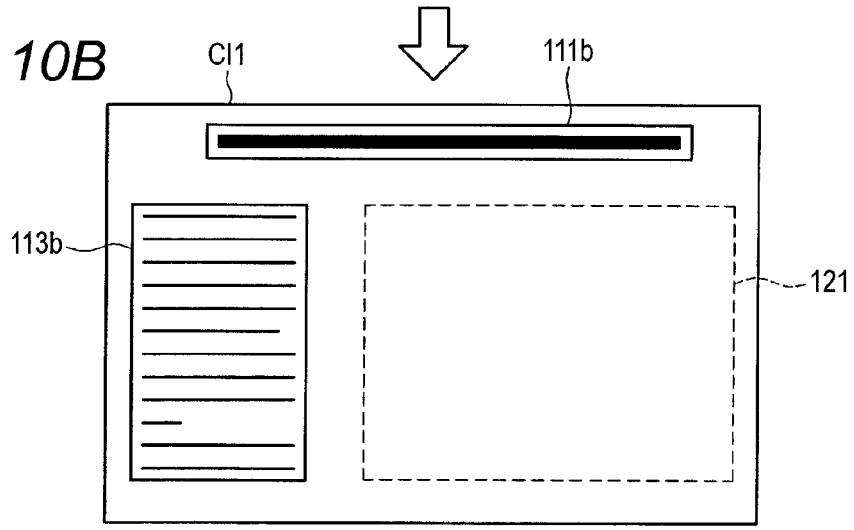

In step S113, the CPU 11 extracts display portions having outlines equal to or greater than a predetermined size from both images, as a rectangular shape. Accordingly, in the image generated by the window shot image data SI1, display portions 111a to 113a are extracted as a rectangular shape, as shown in FIG. 9B. Additionally, in the image generated by the default clip image data CI1, display portions 111b and 113b are extracted as a rectangular shape, as shown in FIG. 10B. By the rectangular extraction process, it is possible to divide the images generated by the window shot image data SI1 and the default clip image data CI1 into a plurality of division areas having a uniform pixel characteristic.

In step S115, the CPU 11 determines whether there is difference between an area in the default clip image data CI1, for which the rectangular extraction process has been performed, and an area in the window shot image data SI1 for which the rectangular extraction process has been performed. Then, the CPU detects an area absent over a wide range as an image absence area. In this illustrative aspect, as shown in FIG. 10B, an image absence area 121 is detected in the image generated by the default image data CI1. Then, the processing proceeds to step S27 (FIG. 2).

In step S27, the CPU 11 determines whether the image absence area is detected. When the image absence area is not detected (step S27: NO), the processing proceeds to step S29. In step S29, the CPU 11 saves the user-setting clip image data CI1 in the save area 23, as the final data. Then, the processing proceeds to step S51 (FIG. 3). On the other hand, when the image absence area is detected in step S27 (step S27: YES), the processing proceeds to step S30. In step S30, the CPU 11 stores information of a display portion (display portion name 301, reference coordinate 302, display portion width 303 and display portion height 304) positioned in the detected image absence area in the image absence area table TB1. In this illustrative aspect, as shown in FIG. 12, the information of the display portion 112 is stored in the image absence area table TB1. Then, the processing proceeds to step S31.

Figure 6:
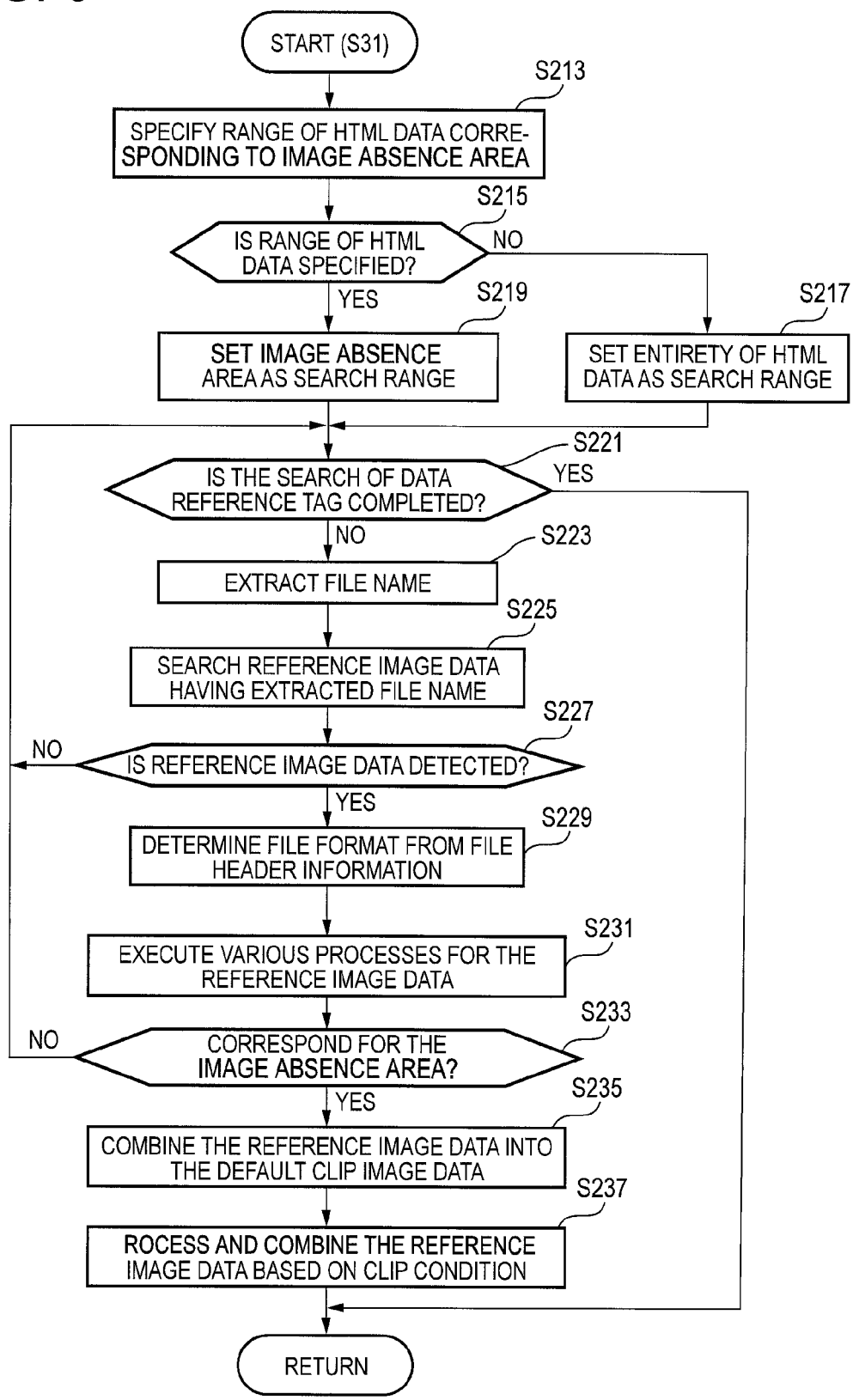
FIG. 6 illustrates a fifth operating flow chart of a printing application.

In step S31, the CPU 11 executes a supplement process of a display portion. The process of step S31 is a process such that, when a display portion is failed by the second and third patterns, supplements the failed display portion by using the cache data. The process of step S31 will be described with reference to FIG. 6. In step S213, the CPU 11 specifies a range of the HTML data corresponding to the image absence area. The HTML data of the image absence area may be detected by supposing detection on the front and rear HTML tags, for example.

In step S215, the CPU 11 determines whether a range of the HTML data corresponding to the image absence area is specified. When the range is specified (step S215: YES), the CPU 11 proceeds to step S219 and sets the range corresponding to the image absence area as a search range. Accordingly, since the range of the HTML data to be searched is narrow, it is possible to increase the search speed. On the other hand, when the range is not specified (step S215: NO), the CPU 11 proceeds to step S217 and sets the entirety of the HTML data as the search range.

In step S221, the CPU 11 determines whether a search for the data reference tag within the search range is completed. When the search within the search range is completed (step S221: YES), the flow ends. When the search within the search range is not completed (step S221: NO), the processing proceeds to step S223. In step S223, the CPU 11 extracts a file name from the path in the data reference tag. A method of extracting the file name will be specifically described. First, a tag of <img src="*"> is detected from the HTML data. The tag <img src="*"> means that a "src" attribute is designated in the tag <img>. The "src" attribute is an essential attribute so that the CPU 11 displays an image in response to the browser application 21b. An absolute or relative URL is described in "***". Then, the data, which is connecting with the detected absolute or relative URL, is extracted from after the last slash. Accordingly, the file name is extracted. As a specific example, when the detected data reference tag is "http://aaa.com/bbb/ccc/ddd", "ddd" is extracted as the file name.

In step S225, the CPU 11 searches reference image data having the extracted file name in the browser application storage area 23b. In step S227, the CPU 11 determines whether the reference image data is detected. When the reference image data is not detected (step S227: NO), the processing returns to step S221. When the reference image data is detected (step S227: YES), the processing proceeds to step S229. In step S229, the CPU 11 determines a file format from file header information of the detected reference image data. Accordingly, even when it is not possible to determine a file format from a file name, such as a case where an extension is not attached to the file name, it is possible to determine the file format. In step S231, the CPU 11 performs various processes for the detected reference image data when processes such as expansion/reduction and trimming of an image are designated by the data reference tag.

In step S233, the CPU 11 determines whether the reference image data after the process is suitable for the image absence area. The determination may be performed by determining whether the display portion width and height of the display portions displayed by the reference image data after the process are corresponding to the width and height of the image absence area, for example. When the reference image data is not corresponded (step S233: NO), the processing returns to step S221. On the other hand, when the reference image data is corresponded (step S233: YES), the processing proceeds to step S235. In this illustrative aspect, since it is described that the display portion displayed by the reference image data after the process identical with the image absence area 121 (FIG. 10B), the processing proceeds to step S235.

Figure 10C:
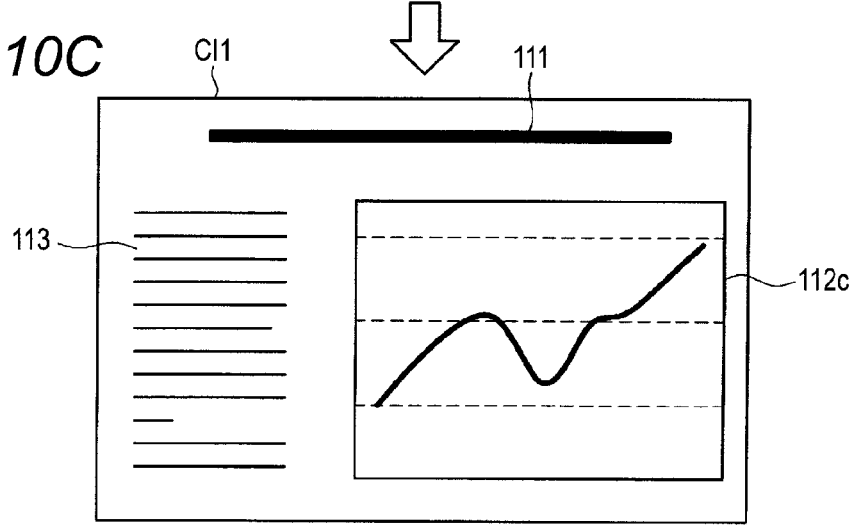

In step S235, the CPU 11 combines the reference image data into the default clip image data CI1. In this illustrative aspect, as shown in FIG. 10C, the display portion 112c displayed by the reference image data is combined on the position of the image absence area 121 in the image displayed by the default clip image data CI1.

Also, in step S237, the CPU 11 processes the reference image data, based on the clip condition set by the user, and then combines the same into the user-setting clip image data CI2. Then, the processing proceeds to step S37 (FIG. 3).

In step S37 (FIG. 3), the CPU 11 again determines whether the image absence area is detected in the default clip image data CI1 after executing the process of step S31. When the image absence area is not detected (step S37: NO), the CPU 11 proceeds to step S39 and saves the user-setting clip image data CI2 in the save area 24, as final data for which the clip process has been completed. On the other hand, when the image absence area is detected (step S37: YES), the CPU 11 determines that a display portion is failed in the default clip image data CI1 by the third pattern and proceeds to step S41.

In step S41, the CPU 11 performs a process of extracting the image absence area from the window shot image data SI1.

Figure 5:
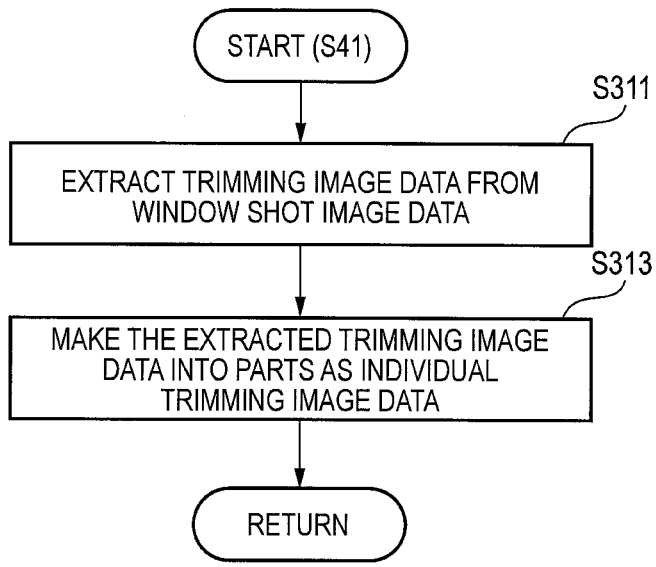
FIG. 5 illustrates a fourth operating flow chart of a printing application.

The process of step S41 will be described with reference to FIG. 5. In step S311, the CPU 11 extracts trimming image data, which is obtained by trimming the image data of the area corresponding to the image absence area, from the window shot image data SI1 of the bitmap format. The trimming process is performed by using the data (display portion name 301, reference coordinate 302, display portion width 303 and display portion height 304) of the image absence area table TB1. In step S313, when the extracted trimming image data configured by trimming image data extending over a plurality of areas, the CPU 11 makes the extracted trimming image data into portions as trimming image data for individual area. Accordingly, even when a plurality of image absence areas is separate from each other in the image generated by the default clip image data CI1, it is possible to extract the trimming image data corresponding to each of the image absence areas. Then, the processing returns to step S43 (FIG. 3).

In step S43, the CPU 11 processes the trimming image data, based on the clip condition set by the user. In step S45, the CPU 11 combines the processed trimming image data into the user-setting clip image data CI2. In step S46, the CPU 11 saves the combined user-setting clip image data CI2 in the save area 23, as the final data for which the clip process has been completed.

In step S51, the CPU 11 determines whether the background data acquisition invalidating setting is enabled in the user's setting of the user-setting clip image data CI2. The determination is performed by referring to the setting storage area 25. When the background data acquisition invalidating setting is disabled (step S51: NO), the processing skips over step S63 and proceeds to step S55. On the other hand, when the background data acquisition invalidating setting is enabled (step S51: YES), the CPU 11 determines that a display portion is not failed in the default clip image data CI1 and a display portion may be failed in the user-setting clip image data CI1 (fourth pattern), and then proceeds to step S53.

Figure 11A:
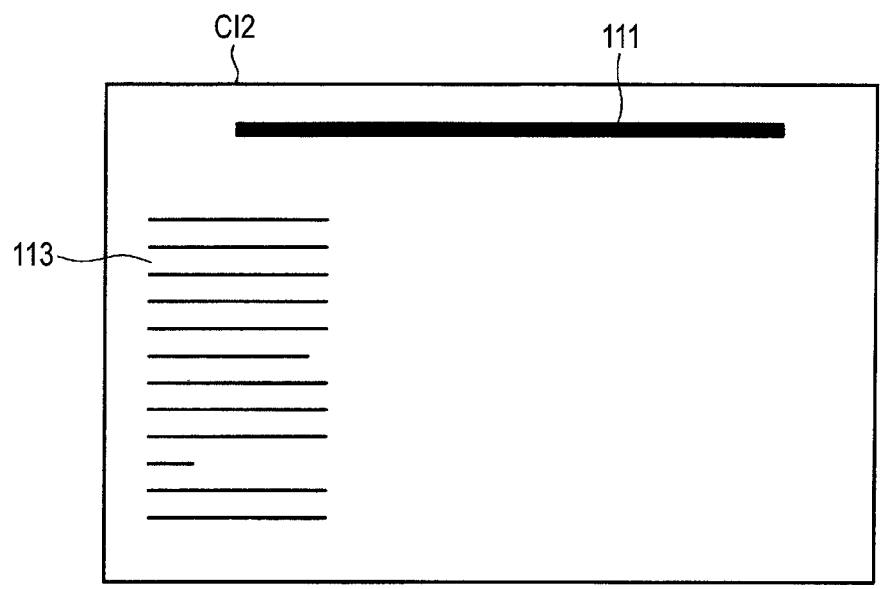
FIG. 11A and FIG. 11B are views illustrating an example of an image generated by user-setting clip image data.

In this illustrative aspect, a example case, in which the background data acquisition invalidating setting is enabled for the image data of the display portion 112, will be described. In this case, as shown in FIG. 11A, the display portion 112 is not displayed in the image generated by the user-setting clip image data CI2.

Figure 7:
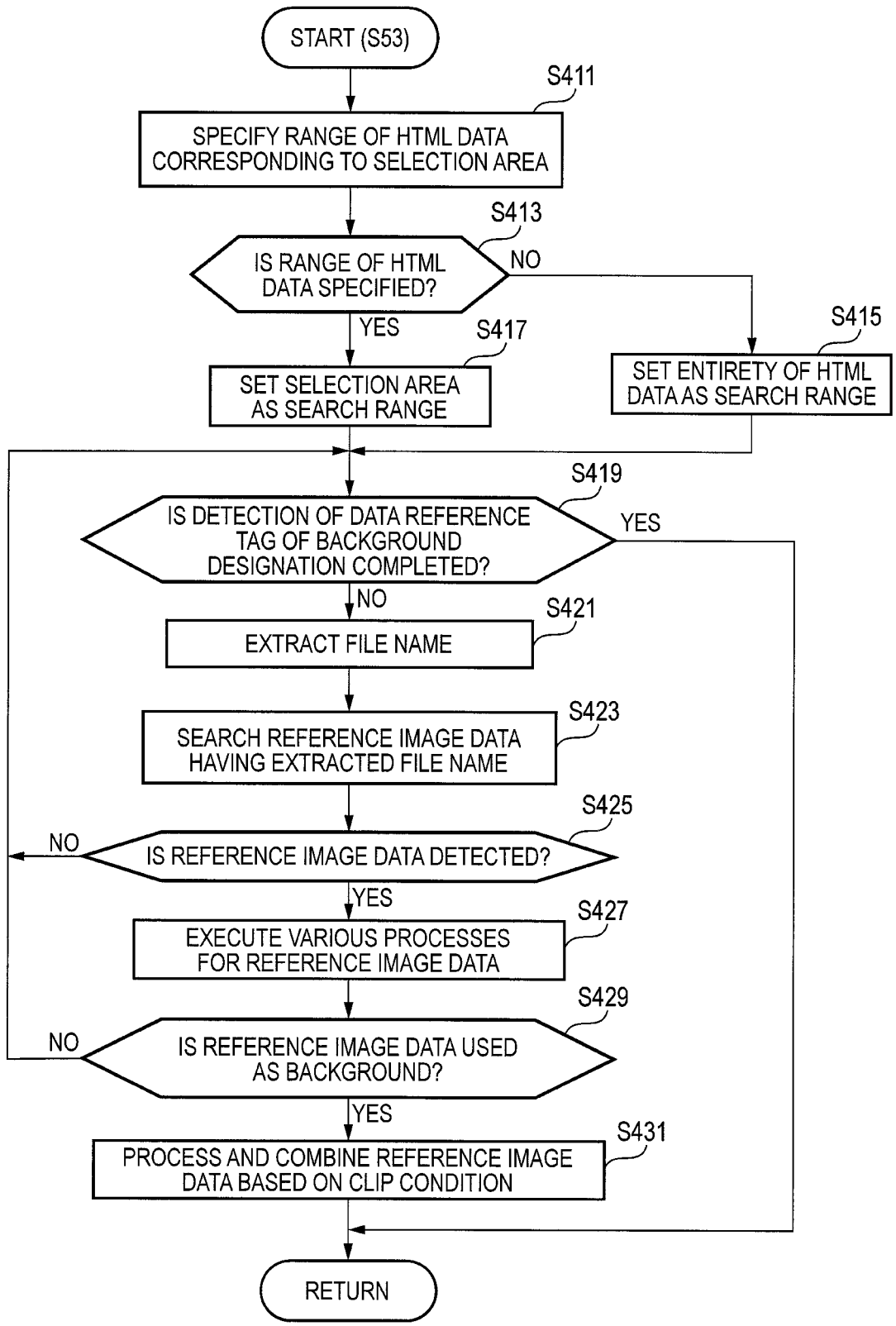
FIG. 7 illustrates a sixth operating flow chart of a printing application.

In step S53, the CPU 11 performs a display return process of the display portion designated as a background. The process of step S53 will be described with reference to FIG. 7. In step S411, the CPU 11 specifies a range of the HTML data corresponding to the selection area 102. In step S413, the CPU 11 determines whether the range of the HTML data corresponding to the selection area 102 is specified. When the range is specified (step S413: YES), the CPU 11 proceeds to step S417 and sets the range corresponding to the selection area 102 as the search range. Accordingly, since it is possible to narrow the range of the HTML data to be searched, it is possible to increase the search speed. On the other hand, when the range is not specified (step S413: NO), the CPU 11 proceeds to step S415 and sets the entirety of the HTML data as a search range.

In step S419, the CPU 11 determines whether the detection for the data reference tag of the background designation from the set range is completed. When the search within the set range is completed (step S419: YES), the flow ends. When the search within the set range is not completed (step S419: NO), the processing proceeds to step S421.

In step S421, the CPU 11 extracts a file name from the path in the data reference tag. Since the specific method of extracting the file name is the same as the method described in step S223, the descriptions thereof will be omitted. In step S423, the CPU 11 searches reference image data having the extracted file name in the browser application storage area 23b.

In step S425, the CPU 11 determines whether the reference image data is detected. When the reference image data is not detected (step S425: NO), the processing returns to step S419. When the reference image data is detected (step S425: YES), the processing proceeds to step S427. In step S427, the CPU 11 performs various processes for the detected reference image data when processes such as expansion/reduction and trimming of an image are designated by the data reference tag.

In step S429, the CPU 11 determines whether the display portion displayed by the processed reference image data is actually used as a background. Specifically, when the display portion displayed by the reference image data is displayed on the webpage image 101, the CPU determines that the display portion is used as a background when a character or another image is displayed with being overlapped on the display portion displayed by the reference image data. On the other hand, when a character and the like is not displayed with being overlapped on the display portion displayed by the reference image data, the CPU determines that the display portion is used as a single image and is not used as a background.

The method of determining whether the display portion is used as a background will be described in details. First, it is trimmed that a difference area between the window shot image data SI1 of the bitmap format (image data in which a display portion is not failed) and the user-setting clip image data CI2 (image data in which a display portion is failed) from the window shot image data SI1. In the meantime, since the specific method of performing the trimming process for the window shot image data SI1 is the same as the method described in step S41, the descriptions thereof will be omitted. Then, the image trimmed from the window shot image data SI1 is compared with the reference image data obtained in step S427 to determine whether there is the difference between both images. When there is the difference, a character and the like is displayed with being overlapped on the display portion displayed by the reference image data, thus it is determined that the display portion is used as a background (step S429: NO). Accordingly, the processing returns to step S419. On the other hand, when there is no difference, it is determined that a character and the like are not displayed with being overlapped on the display portion displayed by the reference image data (step S429: YES). Accordingly, since the display portion is not used as a background, it is determined that it is necessary to combine the display portion displayed by the reference image data into the default clip image data CI1. Accordingly, the processing proceeds to step S431.

In this illustrative aspect, as shown in the webpage image 101 of FIG. 8, the other display portions such as characters are not overlapped on the display portion 112. Accordingly, in step S429, the CPU determines that the display portion 112 is not used as a background (step S429: YES).

Figure 11B:
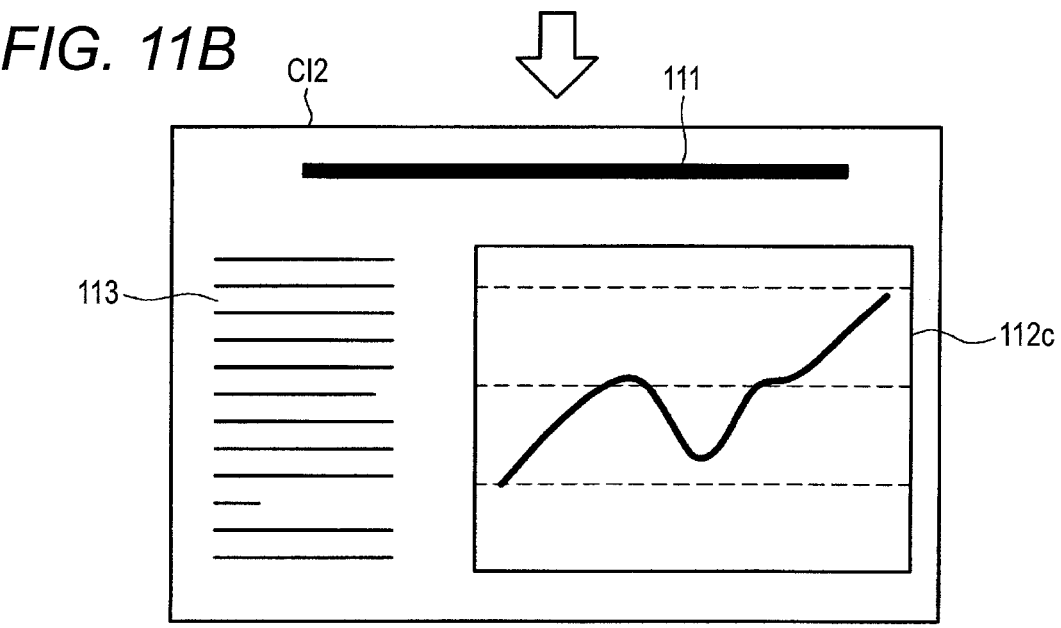

In step S431, the CPU 11 processes the reference image data based on the clip condition set by the user and combines the same into the user-setting clip image data CI2. Then, the processing returns to step S55 (FIG. 3). In this illustrative aspect, as shown in FIG. 11B, the display portion 112c displayed by the reference image data is combined into the user-setting clip image data CI2.

In step S55, the CPU 11 sends the final data saved in the save area 24 to the MFP 51 via the wireless communication.

The MFP 51 prints the final data received from the PC 10 on a printing sheet. Then, the flow ends.

As described above, according to the printing application 21*a* of this illustrative aspect, even when the image absence area is detected, it is possible to generate the image data corresponding to the image absence area by the respective processes such as step S31, step S41, step S53 and the like. Then, it is possible to combine the generated image data into the image absence area of the image generated by the user-setting clip image data CI2. Accordingly, it is possible to prevent a portion of the clip image data of the selection area 102 from being blank.

Although the illustrative aspect of the present invention has been described in detail, it is just illustrative exemplary aspect and does not limit the scope of the present invention. The present invention includes a variety of modifications and changes to the above illustrative aspect.

In the meantime, the input of the selection area 102 is not limited to the aspect of using the input device such as mouse 19 and the like. For example, if the monitor 18 may be made of a touch panel, the selection area 102 may be selected by a finger, a pen and the like. In addition, the shape of the selection area 102 is not limited to the rectangular shape. For example, the shape of the selection area may be parallelogram or circular.

Also, in step S113, the display portion having the outline of a predetermined size or greater is extracted as a rectangular shape. However, the present invention is not limited thereto. For example, a blank portion of a predetermined size or greater may be extracted as a rectangular shape.

In step S431, the reference image data is combined into the user-setting clip image data CI1. However, the present invention is not limited thereto. For example, the reference image data corresponding to the selection area 102 may be detected and the designation of the background image may be canceled. Accordingly, the display portion, which is not displayed in the user-setting clip image data CI2 by the fourth pattern, can be displayed. In the process in response to the printing application 21*a*, a blank area is generated when the image data cannot be acquired even when accessing the process in response to the browser application 21*b*. In addition to this, the bank area may be generated when the process in response to the in-line applications cannot be accessed from the process in response to the printing application 21*a*. In this process in response to the printing application 21*a*, instead of the blank area, an error area in which the character string such as "cannot be displayed" is inserted may be generated. In this case, the CPU may determine whether there is the error area in step S15.

In step S111, the CPU 11 may perform out of the outline processing for the default clip image data CI1 and the window shot image data SI1 so as to be easy to detect whether images are identical. For example, a subtractive color processing, monochrome processing, or low-resolution processing may be performed. Additionally, if it is possible to detect the identification between the default clip image data CI1 and the window shot image data SI1, the outline processing may not be performed. In this case, the default clip image data CI1 and the window shot image data SI1, which are full-color bitmap data, are used in subsequent process.

In addition, the technical elements described and shown in the specification and the drawings provide the technical usefulness independently or in combination and are not limited to a combination of the above description. Further, the technologies exemplified in the specification or drawings achieve the purposes at the same time, and a technical usefulness is realized by achieving one of proposes.

In the meantime, the PC 10 is an example of a computer. The web server 71 is an example of the source of the webpage data. The HTML data is an example of the webpage data. The browser application 21*b* is an example of the webpage display unit. The printing application storage area 23*a* and the browser application storage area 23*b* are examples of the storage unit. The default clip image data CI1 is an example of the first image data. The window shot image data SI1 is an example of the second image data. The text editing application 21*c* and the spreadsheet application 21*d* are examples of the information display unit.

In addition, the control unit executing the process of step S9 is an example of the selection receiving unit. The control unit executing the process of step S11 is an example of the first acquiring unit, the second acquiring unit and the third acquiring. The control unit executing the process of step S23 is an example of the detecting unit. The control unit executing the processes of step S31, step S41, step S17, step S233 and step S311 is an example of the generating unit. The control unit executing the processes of step S45 and step S237 is an example of the compositing unit. The control unit executing the processes of step S55 and step S19 is an example of the output unit.

What is claimed is:

1. A non-transitory computer-readable medium having instructions to control a computer, in which a web browser application is installed to perform a method of image forming control, the method comprising:

acquiring, when a user input unit receives a user input to select, as a selection area, an area in a webpage image displayed in a display unit by using webpage image data, which is generated by the web browser application based on webpage data:

clip image data, which is a part of the webpage data that is base data of the webpage image being an object of the user input and is corresponding to a displayed part displayed in the selection area; and shot image data, which is a part of the webpage image data that is the webpage image being the object of the user input and is corresponding to the displayed part displayed in the selection area, executing:

a clip process to generate a converted clip image, in which the acquired clip image data is converted into a first format; and a shot process to generate a converted shot image, in which the acquired shot image data is converted into the first format;

determining whether the converted clip image, which is generated by the clip process, has a data deficiency relative to the converted shot image, which is generated by the shot process;

storing, when it is determined that the converted clip image has no data deficiency relative to the converted shot image, the clip image data in a save area of a storage unit as save data;

executing, when it is determined that the converted clip image has the data deficiency relative to the converted shot image:

identifying a deficient displayed part, which is the displayed part corresponding to the data deficiency;

executing at least one of:

a first supplemental image data acquiring process, in which a file name of an image file corresponding to the deficient displayed part is acquired from the base data of the webpage image being an object of the user input and in which an image data of the image file having the file name is acquired as supplemental image data being image data to supply the deficient displayed part; and a second supplemental image data acquiring process, in which image data that is a part of the shot image data and is corresponding to the deficient displayed part is acquired as supplemental image data being image data to supply the deficient displayed part;

generating combined image data, in which the deficient displayed part is supplied by combining of the clip image data and the supplemental image data, which is acquired by the at least one of the first supplemental image data acquiring process and the second supplemental image data acquiring process; and storing the generated combined image data in the save area of the storage unit as save data.

2. The non-transitory computer-readable medium according to claim 1, wherein the first supplemental image data acquiring process further comprises:

searching a data reference tag included in the webpage data that is data having a mark-up language format;

acquiring a file name in a file path included in the searched data reference tag;

acquiring an image file having the acquired file name from an area, in which the web browser application stores a downloaded image file based on the file path included in the data reference tag; and acquiring image data included in the acquired image file as the supplemental image data.

3. The non-transitory computer-readable medium according to claim 1, wherein the second supplemental image data acquiring process further comprises:

acquiring, as the supplemental image data, a trimmed image data, which is trimmed from the shot image data and is a part of the webpage image, and which is corresponding to a size of the deficient displayed part and a position of the deficient displayed part.

4. The non-transitory computer-readable medium according to claim 1, the method further executing, when it is determined that the converted clip image has the data deficiency relative to the converted shot image, processes comprising:

identifying a plurality of the deficient displayed parts which are displayed parts corresponding to the data deficiency;

executing the first supplemental image data acquiring process;

determining, after executing the first supplemental image data acquiring process, whether any one of the plurality of the deficient displayed parts has not been supplied by the supplemental image data acquired by the first supplemental image data acquiring process; and executing, when it is determined that any one of the plurality of the deficient displayed parts has not been supplied by the supplemental image data acquired by the first supplemental image data acquiring process, the second supplemental image data acquiring process.

5. The non-transitory computer-readable medium according to claim 2, the method further comprising:

determining whether there is a user setting to except a background image data from an object of the clip process;

executing, when it is determined that there is the user setting to except a background image data from the object of the clip process:

searching a background image data reference tag, which is included in the webpage data that is data having the mark-up language format;

acquiring a file name in a file path included in the searched background image data reference tag;

acquiring an image file having the acquired file name from an area, in which the web browser application stores a downloaded image file based on the file path included in the data reference tag;

acquiring image data included in the acquired image file having the acquired file name, as candidate image data which is a candidate of the supplemental image data;

acquiring image data, which is corresponding to the deficient displayed part and is a part of the shot image data, as background image determination data;

determining whether there is difference between the candidate image data and the background image determination data;

acquiring, when there is difference between the candidate image data and the background image determination data, the candidate image data as the supplemental image data.

6. The non-transitory computer-readable medium according to claim 1, the method further comprising:

determining whether an inline application, which generates an image from the image data in a case that the web browser application displays the webpage image, is activated;

determining, when it is determined that the inline application is activated, whether a blank area is generated in the image generated by using the clip image data; and storing, when it is determined that a blank area is generated in the image generated by using the clip image data, the shot image data in the save area of the storage unit as the save data.

7. The non-transitory computer-readable medium according to claim 1, the method further comprising:

performing an area dividing process to divide both the converted clip image data and the converted shot image data into a plurality of division areas having a uniform pixel characteristic; and determining where the converted clip image has a data deficiency relative to the converted shot image for the respective division areas.

8. The non-transitory computer-readable medium according to claim 1, wherein the instructions stored in the non-transitory computer-readable medium are different from the web browser application.

9. The non-transitory computer-readable medium according to claim 8, wherein the instructions stored in the non-transitory computer-readable medium are instructions of an image forming application, and wherein the method further comprises transmitting the save data in the save area of the storage unit to an image forming apparatus.

* * * * *